United States Patent [19]

Spielhoff

[11] 4,234,298
[45] Nov. 18, 1980

[54] APPARATUS FOR REMOVING A CYLINDER FROM A SCREW EXTRUDER

[75] Inventor: Horst Spielhoff, Aligse, Fed. Rep. of Germany

[73] Assignee: Hermann Berstorff Maschinenbau GmbH, Hannover Kleefeld, Fed. Rep. of Germany

[21] Appl. No.: 913,813

[22] Filed: Jun. 8, 1978

[30] Foreign Application Priority Data

Jun. 15, 1977 [DE] Fed. Rep. of Germany ....... 2726963

[51] Int. Cl.³ ............................................. B30B 15/28
[52] U.S. Cl. .................................. 425/186; 248/282; 248/283; 425/188; 425/192 R; 366/79
[58] Field of Search ........... 425/186, 188, 190, 192 R; 248/283, 282

[56] References Cited

U.S. PATENT DOCUMENTS

| 452,743 | 5/1891 | Archibald et al. | 425/190 |
|---|---|---|---|
| 1,285,086 | 11/1918 | Falkinburg | 425/190 |
| 1,546,597 | 7/1925 | Manierre | 248/283 |
| 1,947,202 | 2/1934 | Homeier | 425/186 |
| 2,315,393 | 3/1943 | Bowerman | 248/282 |
| 2,438,856 | 3/1948 | Knowles | 425/190 |
| 2,550,818 | 5/1951 | Johnson | 248/283 |
| 2,795,859 | 6/1957 | Buschbach | 248/283 |
| 3,408,694 | 11/1968 | Matsuoka | 425/186 |
| 4,076,476 | 2/1978 | Ventura | 425/190 |
| 4,094,623 | 6/1978 | Nelson | 425/238 |

FOREIGN PATENT DOCUMENTS 2320556 5/1972 Fed. Rep. of Germany .

Primary Examiner—Murray Tillman
Assistant Examiner—A. H. Koeckert
Attorney, Agent, or Firm—Schwartz, Jeffery, Schwaab, Mack, Blumenthal & Koch

[57] ABSTRACT

Apparatus for removing a cylinder forming the whole or part of the cylinder of a screw extruder, comprising a supporting arm on one end of which the cylinder is pivotally supported, and a further supporting arm to one end of which the other end of said supporting arm is pivoted, the other end of said further supporting arm being pivotally mounted on a base of the screw extruder. Adjusting means may be provided between the cylinder and the outer support arm to adjust the height and inclination of the cylinder, such adjusting means preferably comprising a plate on the support arm, three adjusting set screws in the plate to bear against the cylinder and securing screws to hold the cylinder in the set position.

1 Claim, 6 Drawing Figures

APPARATUS FOR REMOVING A CYLINDER FROM A SCREW EXTRUDER

The invention relates to an apparatus for removing a cylinder forming the whole or part of the cylinder of a screw extruder, and has particular though not exclusive application to removal of a cylinder from a screw extruder with at least one planet rolling member.

In order to clean or replace the screw or individual sections of a screw assembly of a screw extruder it is necessary to remove the extruder cylinder or at least a portion thereof. Various removal apparatus have been proposed but none is satisfactory due mainly to their complex nature and method of operation.

The invention has among its objects to provide apparatus for removing a cylinder from a screw extruder, which apparatus is distinguished by its particularly simple method of operation and its minimal technical complexity.

According to the invention there is provided apparatus for removing a cylinder forming the whole or part of the cylinder of a screw extruder, comprising a supporting arm on one end of which the cylinder is pivotally supported, and a further supporting arm to one end of which the other end of said supporting arm is pivoted, the other end of said further supporting arm being pivotally mounted on a base of the screw extruder.

For the removal of the cylinder a flanged coupling to the remaining portion of the extruder is released. The cylinder can then be withdrawn axially, the supporting arms continuously pivoting about their vertical pivot axes.

During the removal process the cylinder is continually supported by the supporting arms. On completion of the removal process it is possible, due to the pivotal coupling of the cylinder to said supporting arm, to pivot the cylinder member sideways. Thus good access to the screw can be obtained.

The invention makes it possible to remove a cylinder without taking special technical precautions. Understandably, the cylinder can be mounted equally easily by reversing the removal method.

Advantageously adjusting means is disposed between the cylinder and said supporting arm for adjusting the height and inclination of the cylinder with respect to said supporting arm. This enables the cylinder to be aligned so precisely at the time of the initial mounting that the cylinder can always be re-mounted after each removal process in the originally selected position with regard to a remaining portion of the extruder cylinder.

In an advantageous construction the adjusting means comprises a plate mounted on said one end of said supporting arm, adjusting set-screws screwed into the plate and to bear against the cylinder and securing screws extending through the plate and engaged in screw threaded aperatures in the cylinder. By way of the set-screws the cylinder can be aligned with the remaining portion of the extruder cylinder during the initial mounting process. This position is maintained by tightening the securing screws.

The invention is diagrammatically illustrated by way of example in the accompanying drawings, in which.

Figure 1:
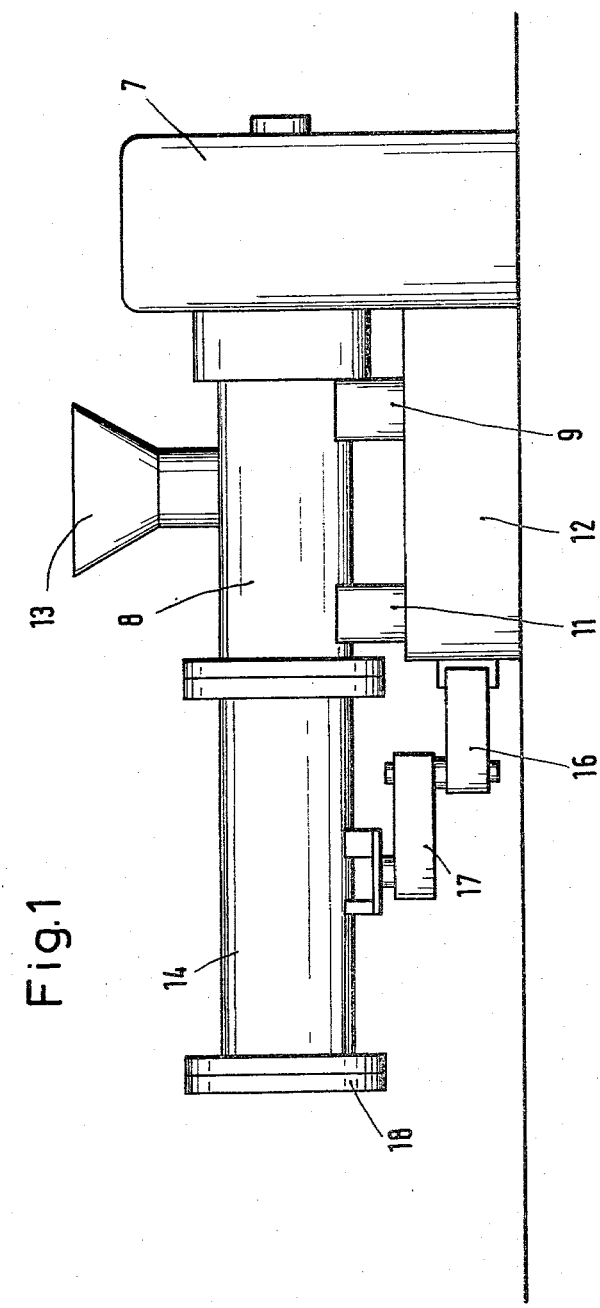
FIG. 1 illustrates a planet rolling extruder with a cylinder in two portions and provided with apparatus according to the invention having a double arm support.
Figure 2:
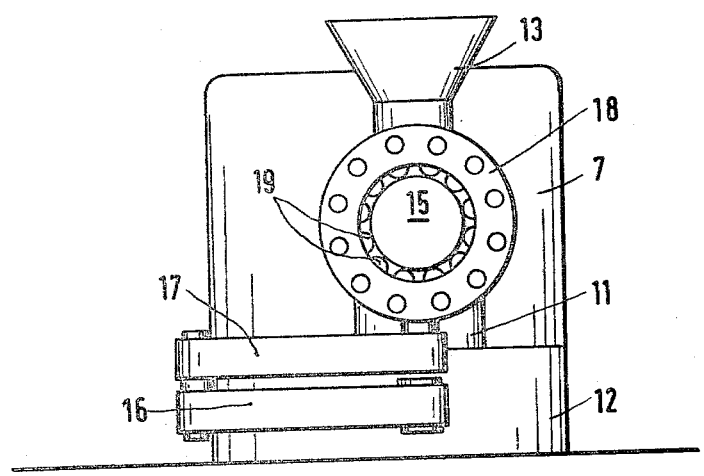
FIG. 2 is a front view corresponding to FIG. 1.
Figure 3:
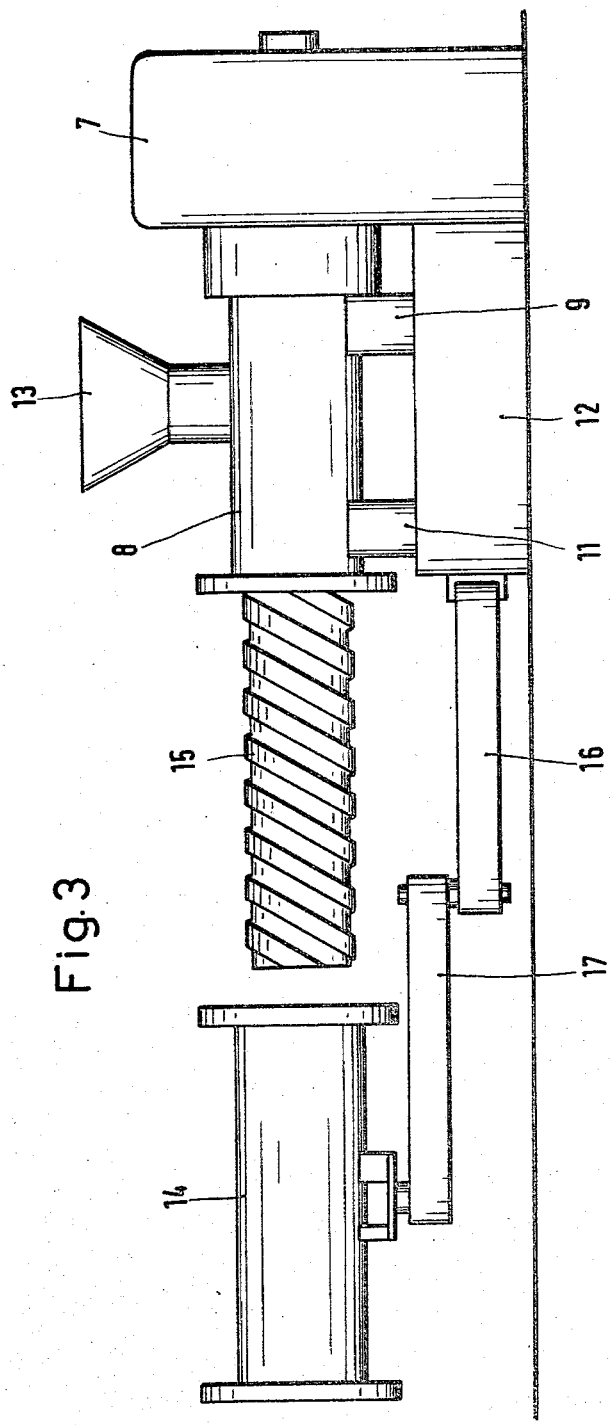
FIG. 3 illustrates the planet rolling extruder of FIGS. 1 and 2 but with one cylinder portion removed.

Referring to the drawings, a planet rolling extruder illustrated in FIGS. 1 to 3 has drive means 7, whereon a cylinder 8 for a filling screw, not visible here, is mounted. The cylinder 8 is supported by way of supporting members 9, 11 on a machine base 12. Material to be extruded is supplied to the cylinder 8 by way of a filling hopper 13. A second cylinder 14 is flanged to the downstream end of the cylinder 8, and is designed to receive a planet rolling assembly. The cylinder 14 of the planet rolling assembly, a main shaft 15 of which is illustrated in FIG. 3, is supported by the machine base 12 by way of two supporting arms 16 and 17. The supporting arms 16 and 17 have swivel hinge connections to the cylinder 14 and the machine base 12 as well as to one another. As can be seen from FIG. 2, when the planet rolling extruder is in operation the supporting arms extend substantially at right angles to the longitudinal axis of the planet rolling extruder.

When the cylinder 14 of the planet rolling assembly is to be removed, a screwed-on end ring 18 is first removed. After first removing a thrust ring, not illustrated, planet shafts 19 (FIG. 2) are screwed out by rotating the main shaft 15. After breaking a connection between the cylinder 14 and the cylinder 8, the cylinder 14 of the planet rolling assembly 15, 19 can be removed in a simple manner in an axial direction (FIG. 3). The weight of the cylinder 14 is borne during removal by the supporting arms 16, 17. Pivoting movement of the cylinder 14 after removal is possible.

Figure 4:
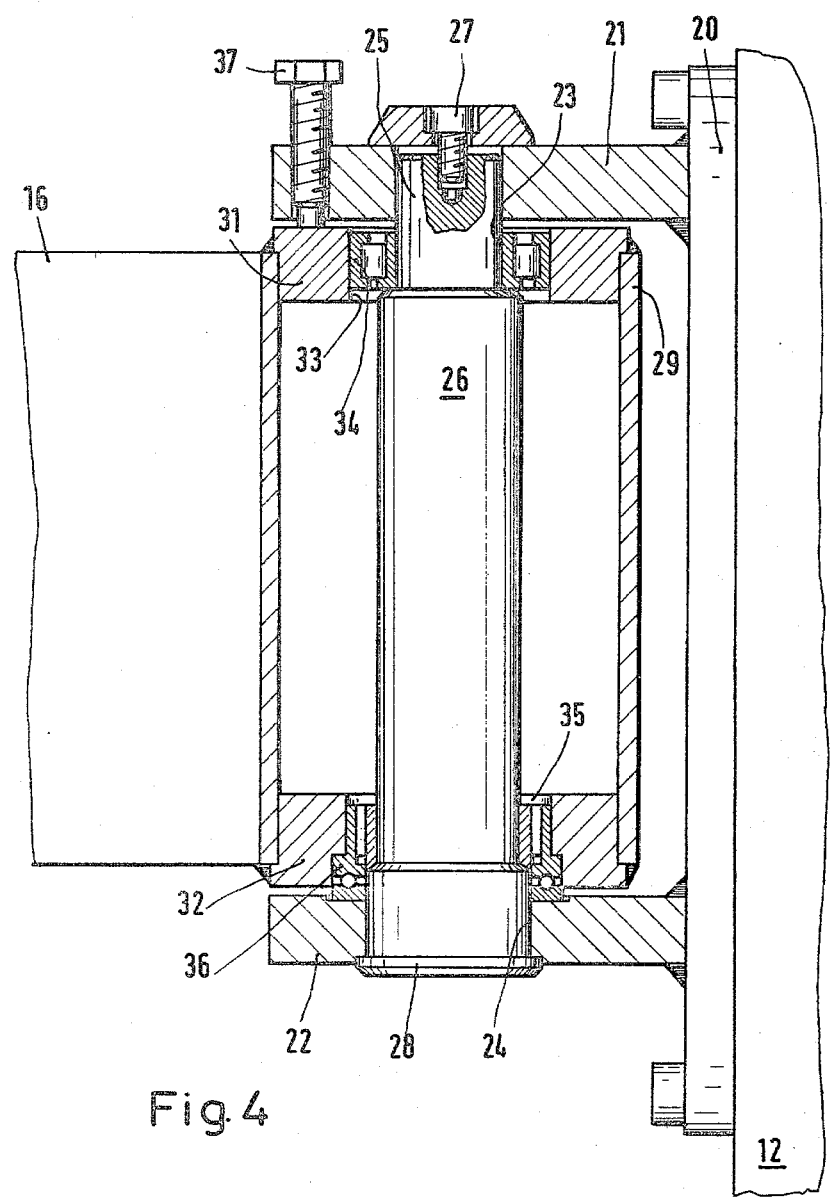
FIG. 4 is a sectional view to a larger scale of a pivotal hinge between a base of the extruder and a lower one of the supporting arms.

FIG. 4 illustrates in more detail the pivotal mounting of the supporting arm 16 on the machine base 12. Bolted onto the front of the machine base 12 is a plate 20 having two spaced horizontal limb plates 21 and 22 welded thereto. Aligned bores 23 and 24 are provided in the limb plates 21 and 22 respectively. An end portion 25 of a pin 26 projects into the bore 23 of the upper limb plate 21, a head 28 of the pin 26 being drawn towards the external surface of the lower limb plate 22 by way of a screw 27 engaged in the pin 26 and acting on a washer bearing on the upper limb plate 21. The inner end of the supporting arm 16, which comprises a sleeve 29 with welded-in bushes 31 and 32, projects between these two limb plates 21 and 22. The upper bush 31 has a bore 33, in which a radial roller bearing 34 is inserted to support the end portion 25 of the pin 26. A combined radial-axial bearing 36 is inserted to support the fixed pin 26 in a stepped bore 35 of the lower bush 32. A brake screw 37 inserted in the upper limb plate 21 serves to slow down the movement when the cylinder 14 is pivoted.

Figure 5:
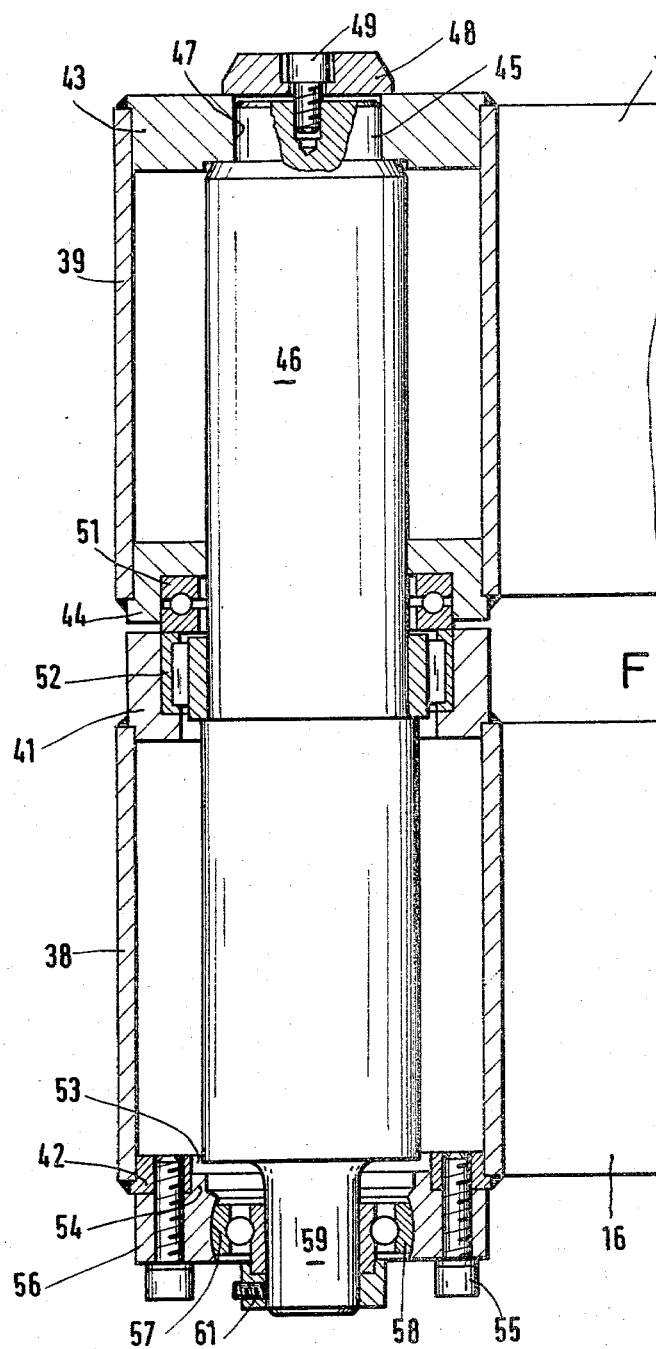
FIG. 5 is a sectional view of the pivot connection between the support arms.

FIG. 5 illustrates the swivel connection of the supporting arms 16 and 17 with one another. The end of each supporting arm has a respective sleeve 38 and 39 welded thereto with two respective bushes 41, 42 and 43, 44 welded therein. An end portion 45 of a pin 46 projects into the bore 47 of the upper bush 43 of the supporting arm 17. A screw 49 is screwed into this pin 45 and is supported by way of a washer 48 on the upper bush 43. In this way the pin 46 is drawn towards the under surface of the upper bush 43. An axial bearing 51 is inserted in the lower bush 44 of the upper supporting arm 17, adjacent to which axial bearing is a radial bearing 52, which is inserted in the upper bush 41 of the lower supporting arm 16.

The lower bush 42 of the supporting arm 16 has a bore 53, into which an annular projection 54 of a bearing ring 56 fits, the bearing ring 56 having a part-spherical inner surface 57 and being secured by way of screws 55 to the bush 42. With this part-spherical inner surface 57 is engaged a matching radial bearing 58, supporting a lower portion 59 of the pin 46. A clamping ring 61 is mounted firmly on the lower end portion 59 to secure the radial bearing 58.

Figure 6:
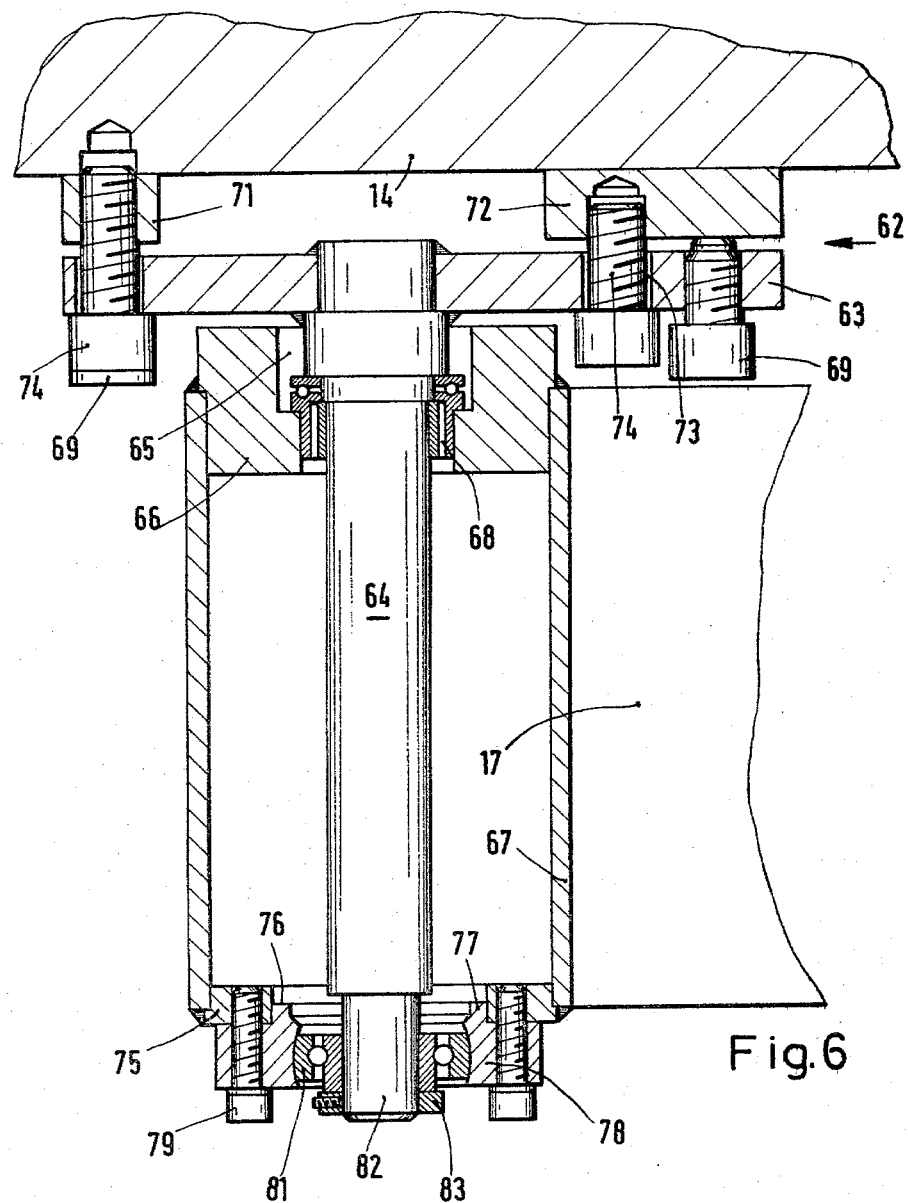
FIG. 6 is a sectional view of the pivot connection between an upper one of the supporting arms and the removable cylinder portion.

FIG. 6 illustrates the swivel connection of the cylinder 14 to the upper supporting arm 17. This shows adjusting means 62 disposed between the supporting arm 17 and the cylinder 14. The adjusting means 62 comprises an adjusting plate 63 with a pin 64 welded thereto, which pin 64 is mounted, by a combined radial-axial bearing 68, in the bore 65 of a bush 66 of a sleeve 67 welded on the end of the upper supporting arm 17. Three set-screws 69 are screwed into the adjusting plate 63 and bear against projections 71 and 72 on the cylinder 14. In addition the adjusting plate 63 has three through-bores 73, through which securing screws 74 pass, the securing screws engaging in tapped bores in the projections 71 and 72 of the cylinder 14. In this way the adjusting plate 63 is securely but adjustably connected to the cylinder 14 in a manner such that the orientation and height of the cylinder 14 can be adjusted with respect to the supporting arm 17.

A bore 76 in a lower bush 75 of the sleeve 67 of the upper supporting arm 17, receives an annular projection 77 of a bearing ring 78 having a part-spherical inner surface. The bearing ring 78 is secured by means of screws 79. Engaged with the part-spherical inner surface of the bearing ring 78 there is a matching radial bearing 81 which supports an end portion 82 of the pin 64. A clamping ring 83 is firmly mounted on the end portion 82 to secure the radial bearing 81.

When the cylinder 14 is initially mounted on the cylinder 8 the projections 71 and 72 of the cylinder 14 are engaged with the adjusting plate 63. The cylinder 14 is aligned with the cylinder 8 by means of the three set-screws 69, which form a three-point bearing. After alignment the cylinder 14 is secured firmly in the aligned position by tightening the three securing screws 74.

To remove the cylinder 14, bolts clamping the cylinder 14 to the cylinder 8 are removed and the cylinder 14 pulled away from the cylinder 8 causing the arms 16, 17 to move from the position of FIGS. 1 and 2, where they extend obliquely transverse to the axis of the cylinder 14, to the position of FIG. 3 where they extend generally parallel to the axis of the cylinder 14.

What is claimed is:

1. Apparatus for removing a cylinder of a screw extruder comprising
   (a) a base;
   (b) a first cylinder, and means for fixedly mounting said first cylinder on said base;
   (c) a second cylinder adapted to be aligned with and connected to said first cylinder for receiving an extruding member;
   (d) a first supporting arm;
   (e) means for pivotally mounting one end of said first supporting arm on said second cylinder;
   (f) a second supporting arm;
   (g) means for pivotally mounting one end of said second supporting arm to the other end of said first supporting arm;
   (h) means for pivotally mounting the other end of said second supporting arm to said base of said extruder, whereby said second cylinder can be swung clear of said first cylinder and the remaining parts of the screw extruder, and
   (i) adjusting means disposed between second cylinder and said first supporting arm for adjusting the height and inclination of said cylinder with respect to said first supporting arm, said adjusting means comprising a plate mounted on said one end of said first supporting arm, adjusting set-screws screwed into said plate and adapted to bear against said second cylinder, and securing screws extending through said plate and engaged in screw threaded apertures in said second cylinder for maintaining the same in its adjusted position.

* * * * *